United States Patent Office 3,043,011
Patented July 10, 1962

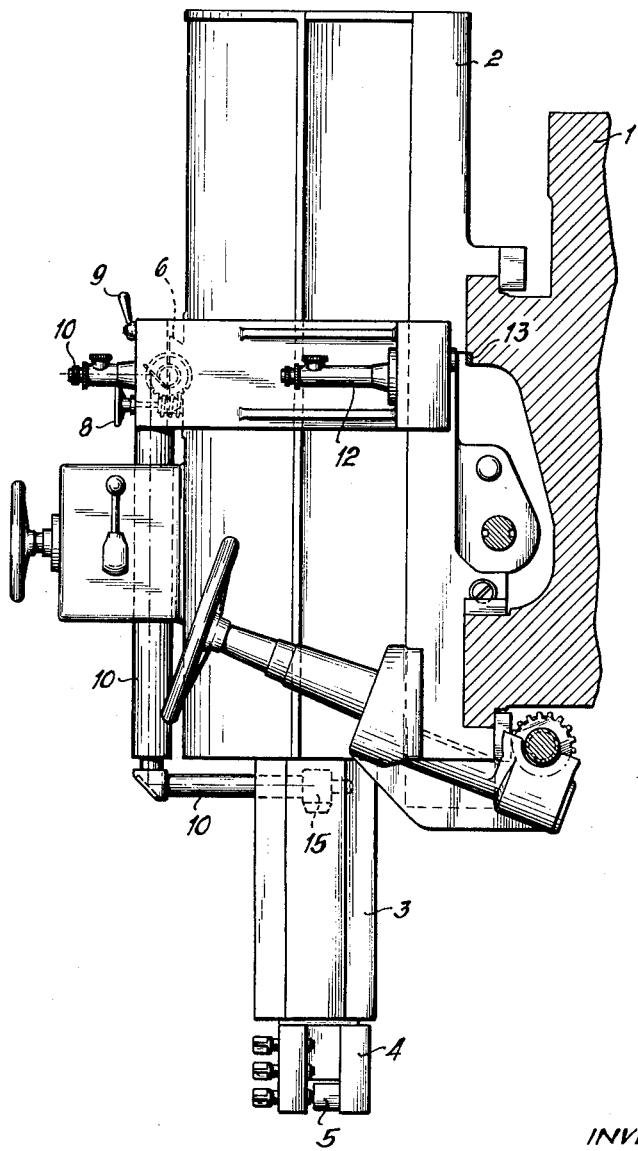

3,043,011
APPARATUS FOR SETTING UP MACHINE TOOLS TO PRODUCE ACCURATE LARGE DIAMETER WORKPIECES AND FOR MEASURING SUCH DIAMETERS
Hans Wegmüller, Wettingen, Switzerland, assignor to Schiess Aktiengesellschaft, Dusseldorf-Oberkassel, Germany
Filed Aug. 20, 1958, Ser. No. 756,137
2 Claims. (Cl. 33—46)

The present invention relates to an apparatus for adjusting and measuring large diameters of workpieces on machine tools, and particularly vertical lathes.

It has always caused considerable difficulties to set up machine tools, and particularly vertical lathes, prior to the cutting operation so as to produce workpieces of an accurate large diameter. Likewise, it has caused considerable difficulties to obtain accurate measurements of the large diameters of such workpieces during the cutting operation. This was due to the fact that the measuring instruments known for this purpose were rather large, heavy, and hard to manipulate. Accurate measurements of such large objects therefore depended to a large extent upon the personal skill and dexterity of the operator of the machine, and the measured values often differed greatly from the admissible tolerances.

It is an object of the present invention to provide an apparatus which permits a machine tool to be set up to produce workpieces of accurate large diameters and which also permits such large diameters to be measured accurately during the cutting operation.

This object will be attained according to the invention by means of an apparatus which essentially consists of a slide carriage which is adjustably mounted on the tool slide of the machine tool and is provided with a telescope which is adjustable by means of the slide carriage so as to point to the outermost cutting edge of the cutting tool, and which further consists of an optical instrument associated with a stationary scale on the machine and disposed at a certain distance from the telescope which permits the diameter of a workpiece to be accurately measured and to be easily and instantly read on the scale through such optical instrument.

In order to adapt the position of the slide carriage to the respective size and position of the cutting tool, the slide carriage is slidably mounted on the tool slide by means of a guideway which is preferably of a prismatic shape and secured to the tool slide, and its adjustment on such guideway may be carried out by means of a handwheel. The slide carriage is preferably adapted to be fixed in position on the guideway by means of clamping levers.

The workpiece and the cutting edge of the tool may be clearly inspected by providing a spotlight at the lower end of the telescope carrying the objective and by directing such spotlight upon the cutting edge of the tool during the adjustment thereof or while a measurement is taken. For checking the horizontal position of the crossbeam of the machine, the slide carriage is further provided with an accurate spirit level. The scale for measuring the diameter of a workpiece is preferably provided on the crossbeam of the machine, and it has a division which permits a direct reading of the measured diameter of the workpiece through a suitable optical instrument.

Further objects, features, and advantages of the present invention will be apparent from the following detailed description thereof, particularly when read with reference to the accompanying drawings, in which—

FIGURE 3 shows a front view of the measuring apparatus according to the invention mounted on the tool slide of a vertical lathe on a larger scale; while
FIGURE 4 shows a side view of FIGURE 3.

Figure 1:
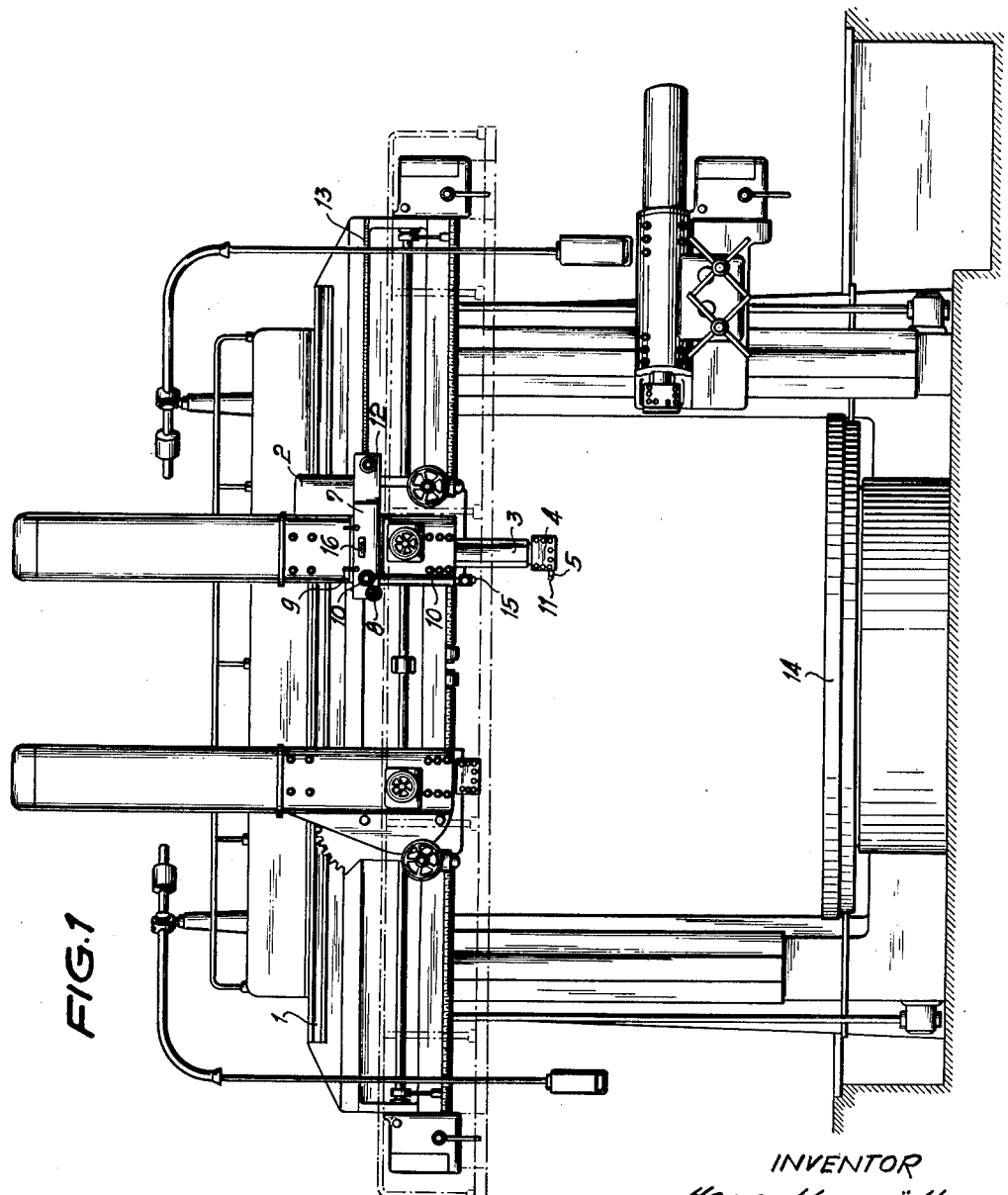
FIGURE 1 shows a front view of the measuring apparatus according to the invention mounted on a vertical lathe.
Figure 2:
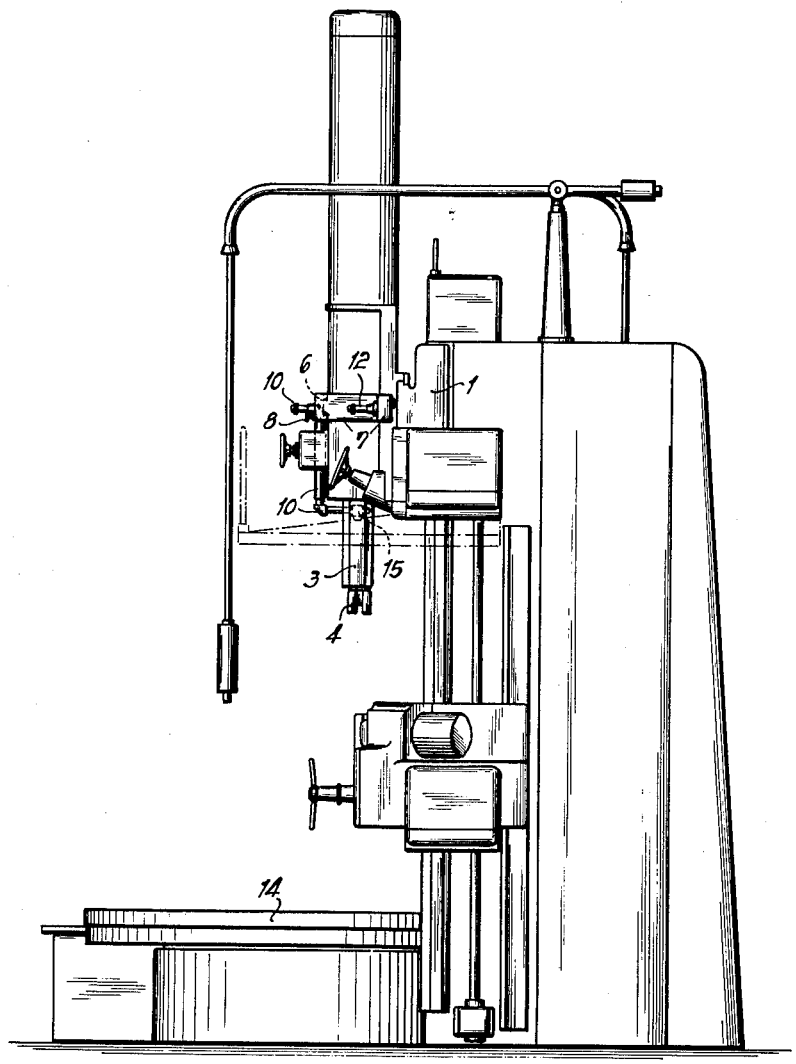
FIGURE 2 shows a side view thereof.
Figure 3:
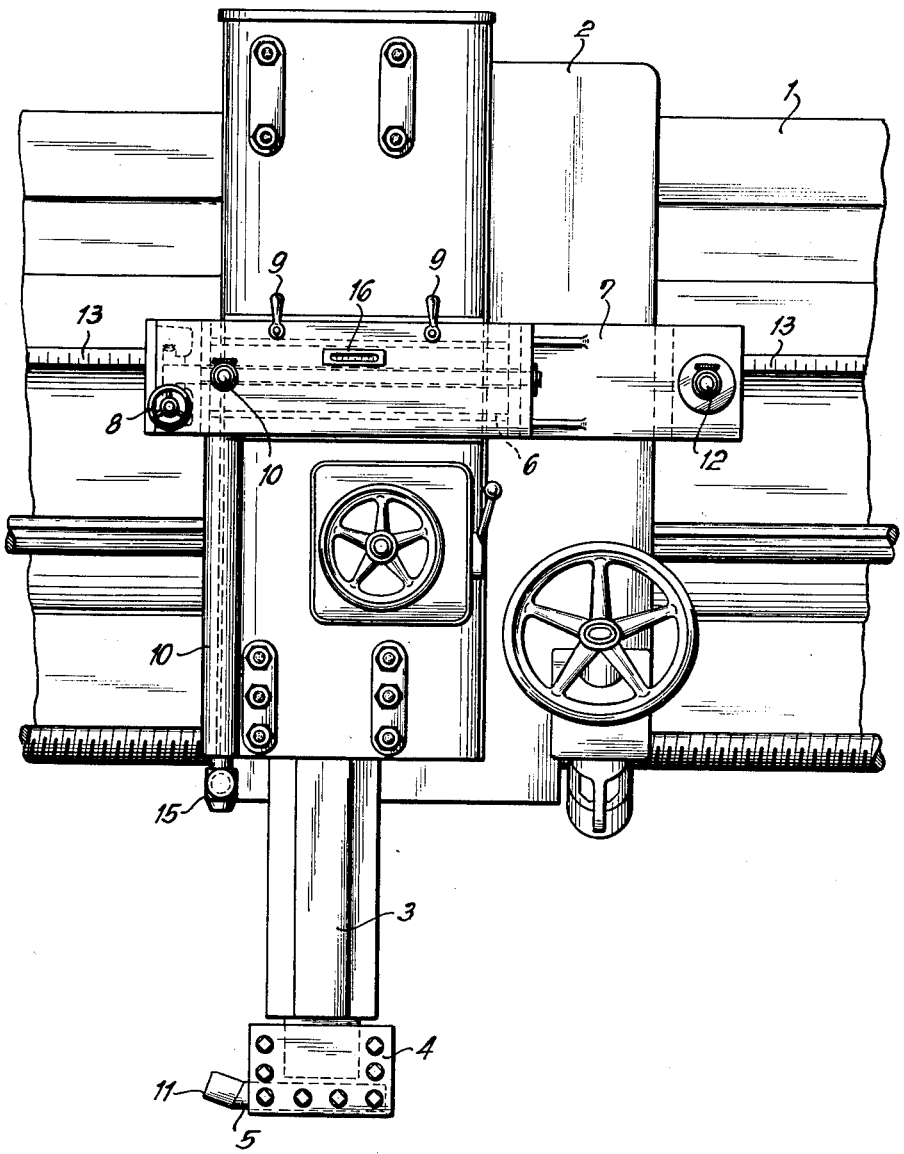

Referring to the drawings, the crossbeam 1 of a vertical lathe carries a tool slide 2 which is adjustable in a horizontal direction transversely to the axis of rotation of the face plate. Tool slide 2 contains a slidable tool holder bar 3 which is guided for movement in a vertical direction and carries on its lower end the means 4 for receiving the tool 5. A guideway 6 which is preferably of a prismatic shape and extends in a horizontal direction is mounted on tool slide 2 and carries a slide carriage 7 with corresponding guide channels therein which may be fixed in any desired position by means of clamping levers 9. Slide carriage 7 carries a telescope 10 through which the cutting edge of tool 5 may be observed, a light at 15 illuminating the cutting edge for more accurate observation. At a suitable fixed distance from telescope 10 slide carriage 7 further carries an optical instrument 12 for inspecting and reading a scale 13 which is secured to crossbeam 1 in a position so that it will be pointing exactly at zero on scale 13 when the cross hairs in the telescope 10 are exactly in line with the center of the surface of face plate 14 of the machine.

Slide 7 further carries an accurate spirit level 16 for checking that slide bar 3 will be in the proper position of perpendicularity relative to the horizontal surface of face plate 14.

For carrying out a measurement, slide carriage 7 will be adjusted by handwheel 8 so that the cross hairs in telescope 10 coincide with the cutting edge 11 of tool 5. Slide carriage 7 will then be secured in a fixed position by clamping levers 9, whereupon tool slide 2 will be adjusted so that the cutting edge 11 of tool 5 touches the peripheral surface of the workpiece. In this position, the size of the diameter of the workpiece may be accurately read on scale 13 through the optical instrument 12.

In order to set up the machine to produce a workpiece of a certain diameter, a similar procedure is followed at first, as above described, that is, telescope 10 will be adjusted so that the cross hairs therein will be in line with the cutting edge 11 of tool 5, after the latter has been clamped on the lower end of tool holder 4. Thereupon, slide 7 will be fixed in this position by clamping levers 9, and tool slide 2 is then shifted until the size of the desired diameter will appear in the optical instrument 12.

Although the apparatus according to the invention is primarily intended for use on a vertical lathe, it may also be designed to be used on other machine tools, for example, a turret lathe and similar machines.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a lathe having a frame and a horizontal face plate rotatable on a vertical axis of rotation in the frame, a tool slide slidably supported on the frame for movement transversely of the said axis of rotation, a tool holder slidably mounted on said tool slide and movable thereon parallel to said axis, and a slide carriage slidably movable on said tool slide in a horizontal direction parallel to the direction of movement of said tool slide, said slide carriage having a telescope fixed thereon with a vertical line of sight for viewing the edge of a tool in said tool holder from above, a horizontal scale on a fixed part of said lathe and parallel to the direction of movement of said tool slide, and an optical device mounted on said slide having a horizontal line of sight normal to said scale for reading said scale, said slide carriage being adjustable on the tool slide to position the telescope in alignment with the cutting edge of said tool, means for locking said slide carriage to said tool slide in its adjusted position thereon, the scale and optical device cooperating for indicating the adjustment of the tool slide on said frame to determine the distance of said cutting edge of said tool from the said axis of rotation of the face plate, and a level mounted on said slide carriage to indicate any tilting movement of the slide carriage on the tool slide.

2. A lathe according to claim 1 in which illuminating means is carried by said telescope to illuminate the area being viewed by the telescope.

References Cited in the file of this patent

UNITED STATES PATENTS

| | | |
|---|---|---|
| 354,740 | Rogers | Dec. 21, 1886 |
| 1,467,403 | Toomey | Sept. 11, 1923 |
| 1,907,469 | Thomson | May 9, 1933 |
| 1,931,730 | Klay | Oct. 24, 1933 |
| 1,959,537 | Kuhne | May 22, 1934 |
| 2,135,640 | Holtmeier | Nov. 8, 1938 |
| 2,570,275 | Reading | Oct. 9, 1951 |
| 2,838,889 | Lankes | June 17, 1958 |

FOREIGN PATENTS

| | | |
|---|---|---|
| 771,553 | Great Britain | Apr. 3, 1957 |